United States Patent
Lerenc

(10) Patent No.: US 9,554,244 B2
(45) Date of Patent: Jan. 24, 2017

(54) DISTRIBUTION OF LOCATION AND MOVEMENT INFORMATION OF MEETING PARTICIPANTS

(71) Applicant: SAP SE, Walldorf (DE)

(72) Inventor: Vedran Lerenc, Schoenau (DE)

(73) Assignee: SAP SE, Walldorf (DE)

( * ) Notice: Subject to any disclaimer, the term of this patent is extended or adjusted under 35 U.S.C. 154(b) by 10 days.

(21) Appl. No.: 13/748,985

(22) Filed: Jan. 24, 2013

(65) Prior Publication Data
US 2014/0207375 A1    Jul. 24, 2014

(51) Int. Cl.
| | |
|---|---|
| H04W 4/02 | (2009.01) |
| G06Q 10/06 | (2012.01) |
| G01C 21/34 | (2006.01) |
| G01C 21/36 | (2006.01) |
| G08G 1/00 | (2006.01) |
| H04M 1/725 | (2006.01) |

(52) U.S. Cl.
CPC .......... *H04W 4/02* (2013.01); *G01C 21/3438* (2013.01); *G01C 21/3626* (2013.01); *G06Q 10/06* (2013.01); *G08G 1/20* (2013.01); *H04M 1/72572* (2013.01); *H04W 4/027* (2013.01)

(58) Field of Classification Search
None
See application file for complete search history.

(56) References Cited

U.S. PATENT DOCUMENTS

| | | | |
|---|---|---|---|
| 7,080,019 B1 | 7/2006 | Hurzeler | |
| 7,136,747 B2 * | 11/2006 | Raney | G01C 21/20 340/539.12 |
| 7,848,765 B2 | 12/2010 | Phillips et al. | |
| 8,190,359 B2 * | 5/2012 | Bourne | G01C 21/20 701/410 |
| 8,285,571 B2 * | 10/2012 | Demirdjian | G01S 13/825 705/319 |
| 8,467,991 B2 | 6/2013 | Khosravy et al. | |
| 8,484,661 B2 * | 7/2013 | Walsh | G06F 13/00 719/315 |
| 8,489,111 B2 | 7/2013 | Chawla | |
| 8,504,295 B2 | 8/2013 | Lerenc | |
| 8,600,341 B2 * | 12/2013 | Johnson | H04W 64/00 370/338 |
| 8,615,257 B2 | 12/2013 | Khosravy et al. | |
| 8,626,439 B2 * | 1/2014 | Zhou | G01C 21/3492 701/423 |
| 8,700,301 B2 | 4/2014 | Khosravy et al. | |
| 8,732,727 B2 * | 5/2014 | Walsh | G06F 13/00 719/315 |

(Continued)

*Primary Examiner* — Jean-Paul Cass
(74) *Attorney, Agent, or Firm* — Jones Day

(57) ABSTRACT

Location information of each participant in a carpool or other event may be automatically collected at a central server. The location information may be collected based on an ascertained location of a mobile computing device carried by a participant. The location of each participant's mobile computing device may be obtained through the use of location based services. Each participant's device may push geographic location, speed, and/or movement type information (such as whether the participant is walking or driving) to a central system. The pushed data may then be pulled from the central system by the devices of other interested participants. Methods, computer readable media, and devices are provided.

15 Claims, 4 Drawing Sheets

(56) References Cited

U.S. PATENT DOCUMENTS

| | | |
|---|---|---|
| 8,768,614 B2 | 7/2014 | Lerenc |
| 2006/0178949 A1* | 8/2006 | McGrath ................ G06Q 30/02 |
| | | 705/26.1 |
| 2007/0271029 A1* | 11/2007 | Tzamaloukas ......... G01C 21/28 |
| | | 701/532 |
| 2008/0091342 A1* | 4/2008 | Assael ................... G08G 1/202 |
| | | 701/533 |
| 2009/0192702 A1* | 7/2009 | Bourne ................. G01C 21/20 |
| | | 701/532 |
| 2010/0144345 A1* | 6/2010 | Darrow ................... H04W 4/16 |
| | | 455/434 |
| 2010/0207812 A1* | 8/2010 | Demirdjian ........... G01S 13/825 |
| | | 705/1.1 |
| 2011/0153728 A1* | 6/2011 | Einarsson ......... H04W 52/0229 |
| | | 709/203 |
| 2011/0231862 A1* | 9/2011 | Walsh .................... G06F 13/00 |
| | | 719/318 |
| 2014/0080520 A1 | 3/2014 | Johnson |
| 2014/0080521 A1 | 3/2014 | Johnson |
| 2014/0129578 A1 | 5/2014 | Lehmann |
| 2014/0180583 A1 | 6/2014 | Doherty et al. |
| 2014/0206393 A1 | 7/2014 | Lerenc |
| 2014/0207373 A1 | 7/2014 | Lerenc |
| 2014/0207375 A1 | 7/2014 | Lerenc |

\* cited by examiner

| Part. | Act Loc | Sched Loc | Distance | Sched Arr | Expected Arrival | Reminder Time |
|---|---|---|---|---|---|---|
| A | P1 | P2 | P1 to P2 | $t1$ | $t0 + t(P1\ to\ P2)$ | |
| B | B0 | P2 | B0 to P2 | $t1$ | $t0 + t(B0\ to\ P2)$ | $t1 - t(B0\ to\ P2) - x$ |
| C | C0 | P3 | C0 to P3 | $t2$ | $t0 + t(C0\ to\ P3)$ | $t2 - t(C0\ to\ P3) - y$ |

DISTRIBUTION OF LOCATION AND MOVEMENT INFORMATION OF MEETING PARTICIPANTS

BACKGROUND

Carpool ride matching systems have been used to automatically match carpool drivers and passengers based on various carpool criteria, such as departure time, arrival time, route, availability, and other factors. Once participants have been assigned to a carpool, the system may notify each of the participants of their assigned meeting location and time. Although the carpooling system may automatically assign these times based on the preferences specified by each participant and an estimated time required to reach each participant, there are nonetheless situations in which one or more participants are late due to traffic, work, or other reasons which may delay the entire carpool and result in poor customer satisfaction.

In the past, carpool participants have typically called or texted each other to either inform the other participants that they will be late or check on a status of the other participants. However, having to manually check on the status of other participants by calling or texting is inconvenient and time consuming. Not only that, but repeatedly calling or texting to send or receive status updates has been perceived as disruptive and annoying. Additionally, carpool drivers may be prohibited from texting while driving or talking on the phone without a hands-free communication device.

There is a need for automatically collecting and distributing status information about carpool participants, such as location, speed, and movement information of each carpool participant, to automatically update each carpool participant with the status of the other participants.

DETAILED DESCRIPTION

Figure 1:
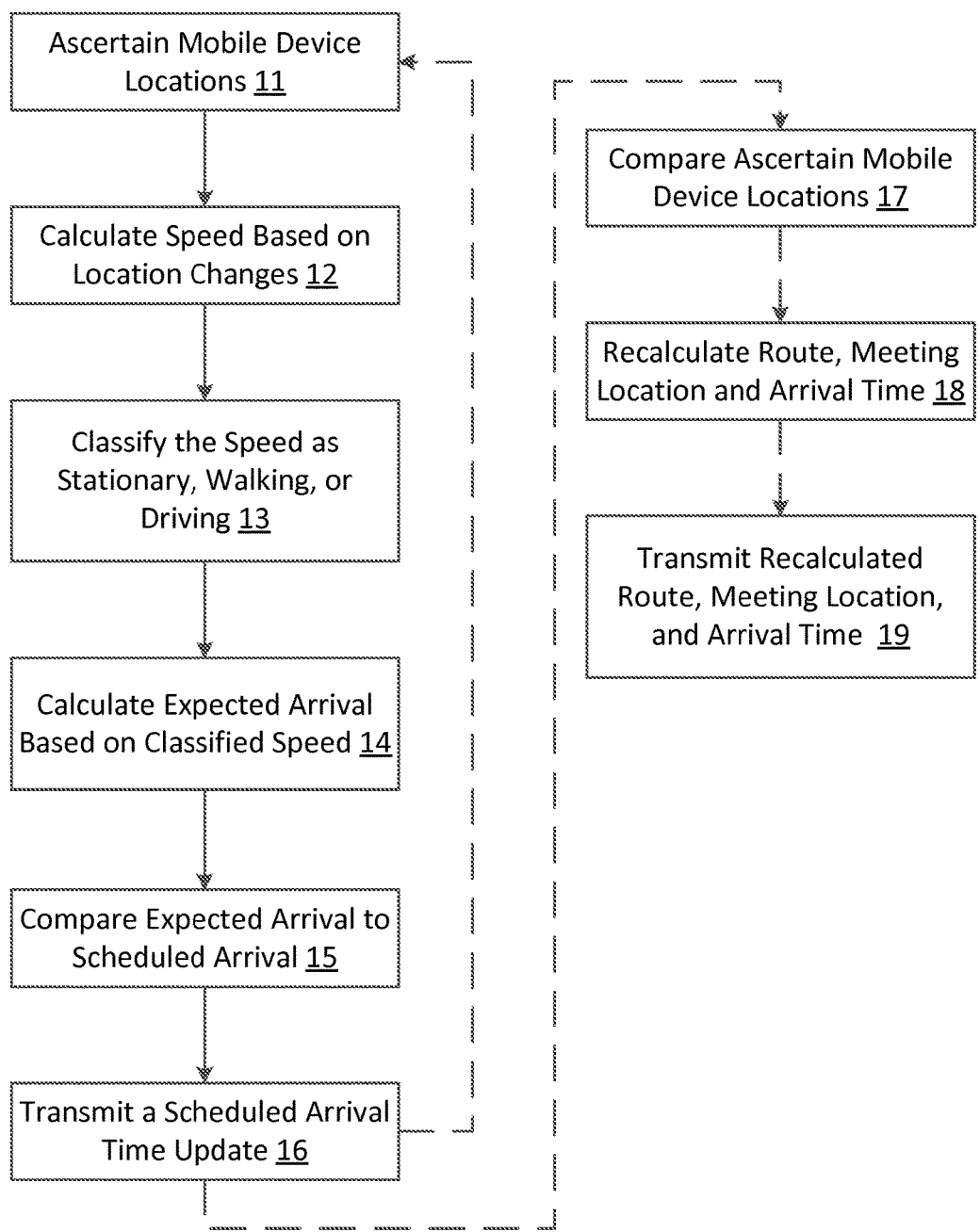
FIG. 1 shows an exemplary process for dynamically distributing location information between carpool participants.

Location information of each carpool participant may be automatically collected at a central server. The location information may be collected based on an ascertained location of a mobile computing device carried by the user. The location of each participant's mobile computing device may be obtained through the use of location based services. Each participant's device may push geographic location, speed, and/or movement type information (such as whether the participant is walking or driving) to a central system. The pushed data may then be pulled from the central system by other interested participants.

Distribution of Location and Movement Information

In some instances, a mobile application or app may be downloaded, installed, or executed on a mobile computing device, such as a smartphone, tablet, laptop, or other device, of one or more carpool participants. The mobile app may use or have access to data from a location based service, such as in some instances data from a global positioning system (GPS), from a multilateration of radio signals between radio towers, or from a known Wi-Fi hotspot in a vicinity of the mobile computing device. Other types of location based services may be used in different instances. The mobile app may also include and/or execute custom code for performing various processes including one or more of the processes described herein. One or more of these processes may run as a background process on the mobile computing device or may be triggered automatically in response to a predetermined event. In some instances, the mobile app may be executed on a participant's mobile computing device. The mobile app may be distributed to different mobile computing devices from one or more servers over a communications network. In some instances, the mobile app may be distributed through an app store on a network.

In some instances, the mobile app may offer a manual mode in which location, movement, and other data about the participant's device is selectively transmitted to the central system. In some instances, the participant user may have to manually initiate the transmission by, in one non-limiting example, actively pushing a button to push the data to the central system. The app may also allow the participant to select one or more status updates, such as "on my way to the car," "stuck in traffic," "already driving," or others, that may be transmitted to the central system to provide additional context or movement information. In some instances, activation of a single button may initiate a transmission of multiple pieces of location and movement information, such as geographic location, speed, and a status update to the central system.

An automatic mode may be provided to offer an active background push of location and movement information. A background service, which may be part of the mobile app, may actively obtain the geographic location and speed information from the mobile phone itself or from an external source and push it in reasonable intervals (in one exemplary and non-limiting situation, 10 seconds when sufficient battery power is left or 30 seconds when there is insufficient battery power) to a central server.

The speed information may be used in some instances to determine a movement state of the participant's mobile computing device. A movement state may include, but is not limited to, whether or not a person or object carrying the mobile computing device is stationary, walking, or driving. In some instances, a speed of below 1 km/h could be interpreted as stationary, a speed above 1 km/h and below 10 km/h could be interpreted as walking, and a speed above 10 km/h could be interpreted as driving. When the location resolution is too low, such as because GPS is not active, movement may be detected with the help of the accelerometers in the mobile computing device. A noise filter may be applied to signals obtained from a location or movement sensor in the mobile computing device. If, after applying a noise filter, the signals from the movement sensor reflect no forces other than the earth's gravitational force, it may be assumed that the person is stationary.

If the accelerometers show motion, but the geographic location hasn't changed yet, walking may be assumed. If the geographic location changes and the speed exceeds a driving threshold speed, driving may be assumed. Accelerometers in mobile computing devices may be used to detect walking patterns. In mobile computing devices that do not support accurate location technologies, such as GPS or location calibration, it may be difficult to determine an accurate speed of the device as it is being moved, but it may still be possible to detect the characteristic wobble motion of a walker deducing her or his movement type.

Participants may be able to both upload their location and movement information to the central system and download the location and/or movement information of other carpool participants. Carpool participants sharing a ride may be able to request location and/or movement information of other participants in the carpool. In some instances, this shared information may be restricted to only participants whose timeliness may be impacted by another participant's delay or timing change. For example, a driver could request location information on the next passenger(s) to be picked up. A passenger may request location information of the driver who will pick up the passenger. Passengers, may however in some instances, be prevented from ascertaining location or movement information about other passengers when there is not a specific need to know the information, such as because the passengers are not directly affected by a timeliness of the other passengers.

Location and/or movement information may be displayed in a map on a mobile computing device. Location information about other participant may be manually requested in some instances. An active background pull of the location and/or movement information may also be used to automatically update the location and/or movement information in the map in reasonable intervals, such as, in one non-limiting embodiment, every 10 seconds while sufficient battery power is left and/or less frequently, such as 30 seconds, when low battery power remains.

A rough estimated arrival time may also be calculated for one or more participants based on the location and movement information. If the device is determined to be stationary, a first estimated arrival time may be calculated. If the device is determined to be on a person that is walking, the estimated arrival time may be approximated by multiplying the distance to a scheduled meeting location for the participant by a current speed of the device. If the device is determined to be in a vehicle that is driving, the estimate arrival time may be calculated by a navigation system or process. The navigation system or process may include a system or process built in to either the mobile computing device and/or the mobile app. The navigation system or process may also be part of the central server and/or may include various navigation services, including, but not limited to web-based navigation services that provide maps and/or directions.

To accommodate privacy concerns, participant may choose whether they want to send their location and/or movement information and they may specify the other persons able to access the information. In some instances access control limits may be manually set. Participants may choose to limit the group of people who have access to their location or movement information that may be pushed to the central server.

In some instances, only the people participating in the carpool may have access to the location and/or movement information of other participants during the planned time window of the carpool or within a predetermined time of the carpool and/or the participant's scheduled participation in the carpool. In some instances, participants sharing a carpool ride may see location and/or movement information of the other participants only from the planned beginning of the ride until the planned end of that ride, or only for their ride segment if they don't share the car for the entire ride.

The sharing of location and/or movement data may be extended if the ride is not over within the scheduled time. This extension may be manually selected by a participant through the mobile app, or the extension may occur automatically based on a determined location at or around the scheduled end time of the carpool. The mobile app could also actively display a prompt to the participant about the extension if the mobile app has detected that the ride is not yet over based on the location information. The participant may choose in some instances to whether or not to allow the extended sharing of location information with the other participants.

Participants may also be able at any time to opt to stop broadcasting their location information through the mobile app. Once a participant has opted to stop broadcasting their location, the location information need not be stored or persisted in the central server and may be deleted. In some instances, only the last location information may be stored in transient memory while the ride is still ongoing and permission to broadcast location information to the other participants is given.

Also, each participant may also be limited to viewing only the location information that is necessary for that participant to see. For example, drivers may see only location information for their passengers. Passengers may see only the driver and their co-passengers, but if a driver first takes in passenger A and drops off passenger A before taking in passenger B, passengers A and B may be prevented from seeing each other's location information.

Location and Distance Based Reminders

Location information may also be used for other purposes as well. For example, location information of each participant may be linked to a reminder system or application on the participant's mobile computing device that reminds the participant of upcoming events, tasks, meetings, and so on. Instead of activating a reminder at a fixed reminder time, such as, for example, fifteen minutes before a scheduled event, location information from location based services may be used to identify a current location of the mobile computing device. The identified current location may then be compared to a meeting, event, or other location and an estimated time to travel between the current location and the meeting location may be calculated.

The reminder may be activated when the estimated travel time is within a predetermined time of a scheduled meeting time at the meeting location. This predetermined time may be a participant selected time to provide sufficient notice to the participant so that the participant can travel to the meeting location and arrive on time. Thus, if the participant is determined to be x minutes away from the meeting location, then the reminder of the meeting may be activated x+y minutes before the scheduled meeting time at the meeting location, where y is an optional extra buffer time to ensure that the participant has sufficient time to travel to the meeting location and arrive early or wrap up a prior task before traveling to the meeting location. The further the participant has to travel to arrive at the meeting location, the earlier the reminder will be activated so that the participant may arrive on time.

To calculate the estimated travel time between the current location and the meeting location, an estimated travel speed may be calculated or assumed. In some instances, the estimated travel speed may be assumed based on a distance between the current location and the meeting location. If this distance exceeds a certain threshold, an assumption may be made that the participant will take a car to the meeting location; otherwise an assumption may be made that the participant will walk to the meeting location. The estimated travel speed may then be selected according to these assumptions.

Distance thresholds and various speeds, such as walking or driving speeds, may be configured individually and/or preset to certain expected values. For example, a participant is unlikely to walk distances measured in kilometers, so distances in kilometers may be associated with driving while distances in meters may be associated with walking. Multiple types of movements, thresholds, and speeds may be provided. For example, on a large campus, a participant may ride a bicycle, walk, or drive to a meeting location. Each of these types of movements may have a threshold value associated with the movement type, which may overlap. For example, for distances in meters, the participant may be assumed to either walk or bike. For distances of a few kilometers, the participant may be assumed to either drive or bike.

The speed associated with each movement type may either be predetermined or may be dynamically determined. For example, a navigation service may be able to estimate a speed based on current or expect travel conditions. In some instances, the estimated travel speed may be calculated from a change in the identified location of the mobile computing device over a known time.

A meeting location may be identified by looking up its geographical coordinates so that its actual location may be identified relative to the current location of the mobile computing device. This may be done by, for example, typing in a mailing address of a location, a known landmark, or a street intersection. In some situations it may be impractical or infeasible to ascertain the geographical coordinates of a meeting location, such as, in one non-limiting example, a particular parking spot in large multi-story parking facility. In these instances, the mobile app may include a learning feature, which would be activated by the participant when the participant is at meeting location with his mobile device for a first time.

When activated, the learn feature may deduce geographical coordinates of the current location of the mobile computing device. The deduced coordinates may be stored with a user supplied a text recognition pattern (e.g. simple strings, strings with wildcards, regular expressions, and so on) to automatically identify the particular meeting location in future reminders. This text recognition pattern can then be used to retrieve the stored geographical coordinates associated with the meeting location to accurately identify the meeting location. A web user interface or map function on a mobile app may also be used to by the participant to manually identify the meeting location on the map and then determining the geographical coordinates of the manually identified meeting location on the map.

In addition to the time needed to reach from one location to another an extension could be to offer the user means to configure also a general or location-specific preparation time. The preparation time in office rooms could be set to a few minutes whereas the preparation time at home may be half an hour. This time would not be computed/estimated, but set by the user either generally or per current location area (e.g. in some configured distance around a given geo location, in the vicinity of certain mobile sending posts, etc.) and added to the reminder time.

In some instance, the location based reminders may be used in carpool systems to ensure that each of the participants arrive at their scheduled meeting locations on time. Existing reminders are activated at predetermined time before a start of a meeting, such as 15 minutes before a meeting. Location based reminders reduce the risk that carpool participants will miss the carpool or arrive late and delay the carpool because the reminders are dynamically activated ahead of time depending on the participant's location to ensure that the participant will have sufficient time when the reminder is activated to travel to the carpool meeting location and arrive on-time.

FIG. 1 shows an exemplary process for dynamically distributing location information between carpool participants. The process may be performed by a processing device. Instructions for performing the process may be stored on a computer readable medium and executed at the processing device to perform the process.

In box 11, a location of different mobile computing devices of different carpool participants may be ascertained at a predetermined time with respect to a scheduled carpool time. The mobile computing device location may be ascertained using a location based service. For example, in some instances location data may be obtained from a global positioning system (GPS) sensor included in the mobile computing device. In other instances, location data may be obtained based on a known location of a wireless hotspot device or router communicating with the mobile computing device. Other types of location based services, systems, and methods may be used in different embodiments.

In box 12, a speed of each respective carpool participant may be calculated based on a measured change in location of their mobile computing device over a known time period.

In box 13, the calculated speed of each respective carpool participant may be classified relative to a stationary, a walking, or a driving speed. The classification may be used to provide status updates about each participant, such as whether the participant is moving or not relative to a stationary speed, whether the participant is stuck in traffic relative to an expected driving speed, or whether the participant is walking or driving to a meeting location. In some instances, a speed of less than 1 km/hr may be classified as stationary, a speed between 1 km/hr and 10 km/hr may be classified as walking, and a speed over 10 km/hr may be classified as driving. In different embodiments, different threshold values and classification categories may be used. In some instances an expected speed may be associated with each of the classification categories.

In box 14, an expected arrival time of each respective carpool participant at their scheduled carpool meeting location may be calculated based on their classified speed and a distance between their ascertained location and their scheduled carpool meeting location. The expected arrival time of each respective carpool participant may be calculated by calculating a time required to travel a shortest route at the classified speed from an ascertained location to a scheduled carpool meeting location.

In box 15, the expected arrival time of each respective carpool participant may be compared to their scheduled arrival time.

In box 16, a scheduled arrival time update may be transmitted over a communications network to one or more other computing devices based on the comparing in box 15. The other computing device may be a central server or it may be a mobile computing device of one of the participants in a carpool. In some instances, the scheduled arrival time update may be transmitted to a mobile computing device of a carpool participant requesting to receiving the scheduled arrival time update. In some instances, the scheduled arrival time update may be automatically transmitted to a mobile computing device of each carpool participant when the scheduled arrival time update is complete.

The process depicted in boxes 11 to 16 may be repeated at two or more predetermined time intervals. As part of the repetition, scheduled arrival time updates may be transmitted at a rate corresponding to the predetermined time intervals. The predetermined time intervals may be fixed or they may vary depending on different criteria. For example, in some instances a first time interval may be selected when a remaining battery power of a respective mobile computing device exceeds a threshold. Otherwise, when the remaining battery power does not exceed the threshold, a second time interval less frequent than the first time interval may be selected.

In box 17, at least two ascertained locations of at least two mobile computing devices of the carpool participants may be compared to each other.

In box 18, a carpool route, a scheduled carpool meeting location of at least one carpool participant, and a scheduled arrival time of at least one participant may be recalculated based on the comparing in box 17 to (i) minimize a duration of the carpool, (ii) minimize a total distance traveled by each of the carpool participants from their ascertained locations to their recalculated scheduled carpool meeting location, or (iii) achieve another predetermined criteria.

In box 19, the recalculated carpool route, the recalculated scheduled carpool meeting location, and the recalculated scheduled arrival time may be transmitted to the mobile computing devices of those participants affected by the recalculating. In some instances, the recalculated carpool route, the recalculated scheduled carpool meeting location, and the recalculated scheduled arrival time may be transmitted as part of an update shown on a map of a mapping application on the respective mobile computing devices of those participants affected by the recalculating.

Figure 2:
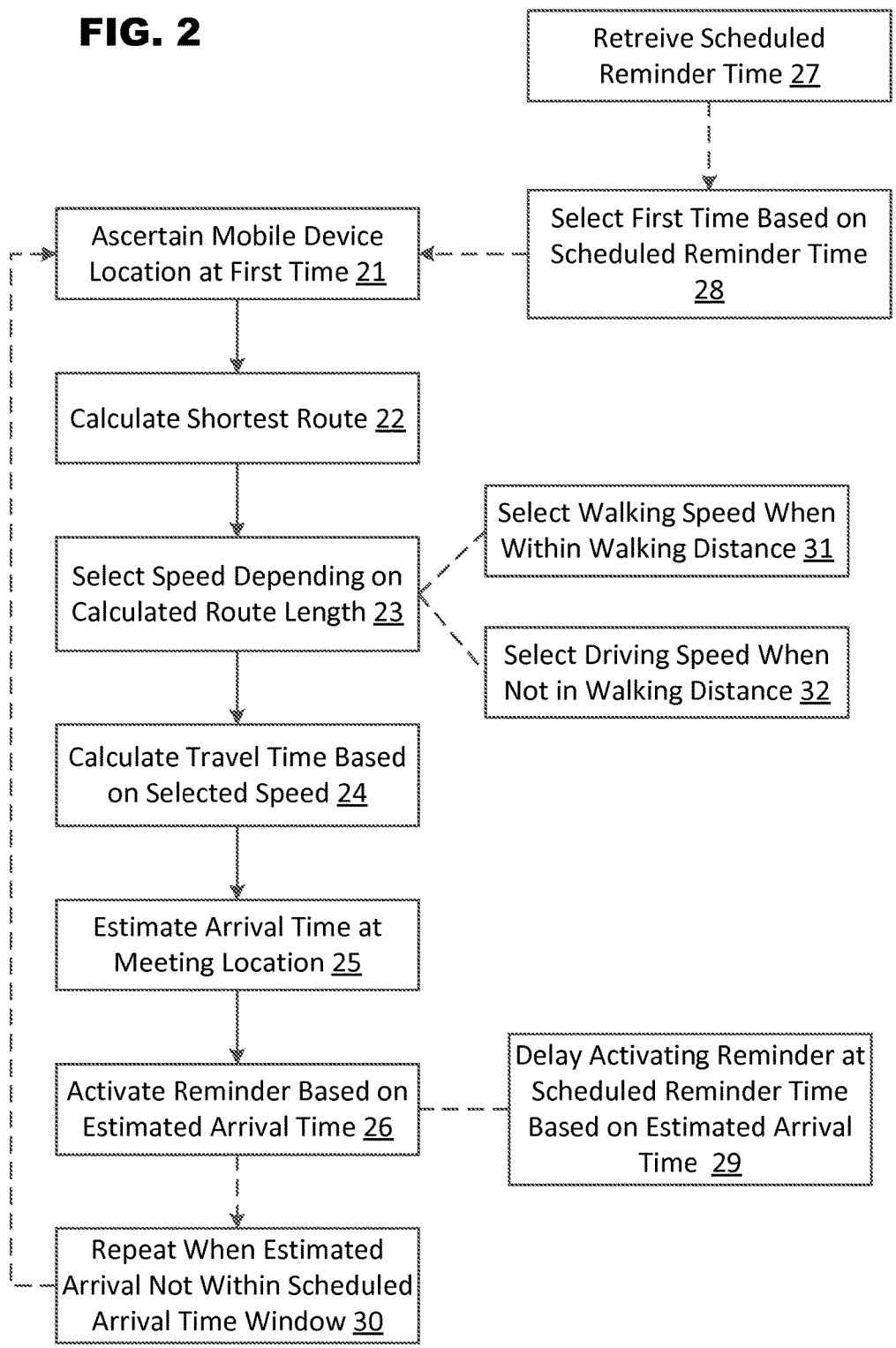
FIG. 2 shows an exemplary process for dynamic reminding a carpool participant about a carpool based on a location.

FIG. 2 shows an exemplary process for dynamic reminding a carpool participant about a carpool based on a location. The process may be performed by a processing device. Instructions for performing the process may be stored on a computer readable medium and executed at the processing device to perform the process.

In box 21, a location of a mobile computing device of the carpool participant at a first predetermined time before a scheduled carpool time may be ascertained. The first predetermined time may be initially determined based on a preexisting scheduled reminder time. For example, when an event, such as a carpool, meeting, or other happening, is initially scheduled, an initial reminder time (such as, in one non-limiting example, 15 min before a scheduled start) may be included as part of the initial scheduling. This initial reminder time may be used to determine the first predetermined time before the scheduled carpool time for ascertaining the location (such as, in one non-limiting example, 10 min before the initial reminder time).

In box 27, this initial or scheduled reminder time may be retrieved from a data source containing information about the carpool or event. In box 28, the first predetermined time may be selected based on the retrieved scheduled reminder time in box 27. In box 29, the activation of the reminder at the scheduled reminder time on the mobile computing device may be delayed until the estimated arrival time is within the second predetermined time of the scheduled carpool time.

In those instances in which there are multiple reminders at different times associated with the same carpool, an activation of at least one of the reminders scheduled for activation between the first predetermined time and the second predetermined time may be delayed until the estimated arrival time is within the second predetermined time of the scheduled carpool time. The activation of any remaining reminders associated with the carpool may also be cancelled to minimize the number of reminders that are activated.

The location of a mobile computing device may be ascertained using a location based service. For example, in some instances, location data obtained from a global positioning system (GPS) sensor included in the mobile computing device may be used to ascertain the location of the mobile computing device. In other instances, the location of a mobile computing device may be ascertained based on a known location of a wireless hotspot device or router communicating with the mobile computing device. Other location based services, techniques, or systems may be used in different embodiments.

In box 22, a shortest route from the ascertained location to a scheduled carpool meeting location may be calculated. The shortest route may be calculated using a route planning application that identifies a traversable route from the ascertained location to the scheduled carpool meeting location. The shortest route may also be calculated using other techniques, including, but not limited to, a straight line distance between the two points.

The medium of claim 15, wherein in the learning mode the processing device associates a participant selected text recognition pattern with the current location and subsequently retrieves the current location when the text recognition pattern is present.

In box 23, an estimated travel speed may be selected depending on a length of the calculated shortest route. In one non-limiting example shown in box 31, an estimated walking speed of a person may be selected as the travel speed when the length of the calculated shortest route is within a predetermined walking distance, while in the non-limiting example shown in box 32, an estimated vehicle speed may be selected as the travel speed when the length of the calculated shortest route exceeds the predetermined walking distance. The estimated vehicle speed may be obtained from a route planning application that may specify different speeds associated with different road segments.

In some instances, the carpool participant may be provided with the option to select from different modes of transportation, such as walking, biking, traveling by subway, driving, and/or others. The travel speed may be selected based on the user selected transportation mode.

In box 24, a travel time from the ascertained location to a scheduled carpool meeting location at the selected travel speed may be calculated.

In box 25, an arrival time at the scheduled carpool meeting location based on the calculated travel time may be estimated.

In box 26, a reminder on the mobile computing device reminding the carpool participant of the carpool may be activated when the estimated arrival time is within a second predetermined time of the scheduled carpool time. The second predetermined time may be selected by the carpool participant and may include a time buffer requested by the user before the scheduled carpool time to provide the carpool participant with additional time to travel to scheduled carpool location.

In box 30, the process in boxes 21 to 26 may be repeated with an updated first predetermined time before the scheduled carpool time when the estimated arrival time is not within a second predetermined time of the scheduled carpool time. The updated first predetermined time may be selected based on a time difference between the estimated arrival time and the second predetermined time of the scheduled carpool time to reduce the chances that the location will be reascertained in a timely manner but not too frequently to avoid draining the battery.

Although the processes described above are described with respect to carpool applications, the processes is not limited to carpools per se, and may be used with any event, meeting, appointment, task, or happening that requires coordination of the locations of multiple participants and/or includes a reminder that is intended to be activated beforehand to remind one or more of the participants.

Additionally, while scheduled carpool meeting locations may be generally known and easily identifiable, such as a specific street address or intersection, in some instances the precise location of a meeting, appointment, task, or happening may be harder to pin down. Some non-limiting examples of these locations that may be hard to precisely identify include a particular meeting room in a campus of connected buildings, or a specific parking area in a large, spread out parking lot.

In these instances, a learning mode may be used in which the participant selects a 'set location' function when the user is at the scheduled event location with the mobile computing device. This may be done prior to the first predetermined time before the scheduled event so that the mobile computing device can subsequently identify the scheduled event location. A location based service may be used to identify a current location of the mobile computing device and set the current location as the scheduled event location. In the learning mode, a participant selected text recognition pattern may be associated with the 'set location' and the current location may be subsequently identified when the text recognition pattern is present.

Figure 3:
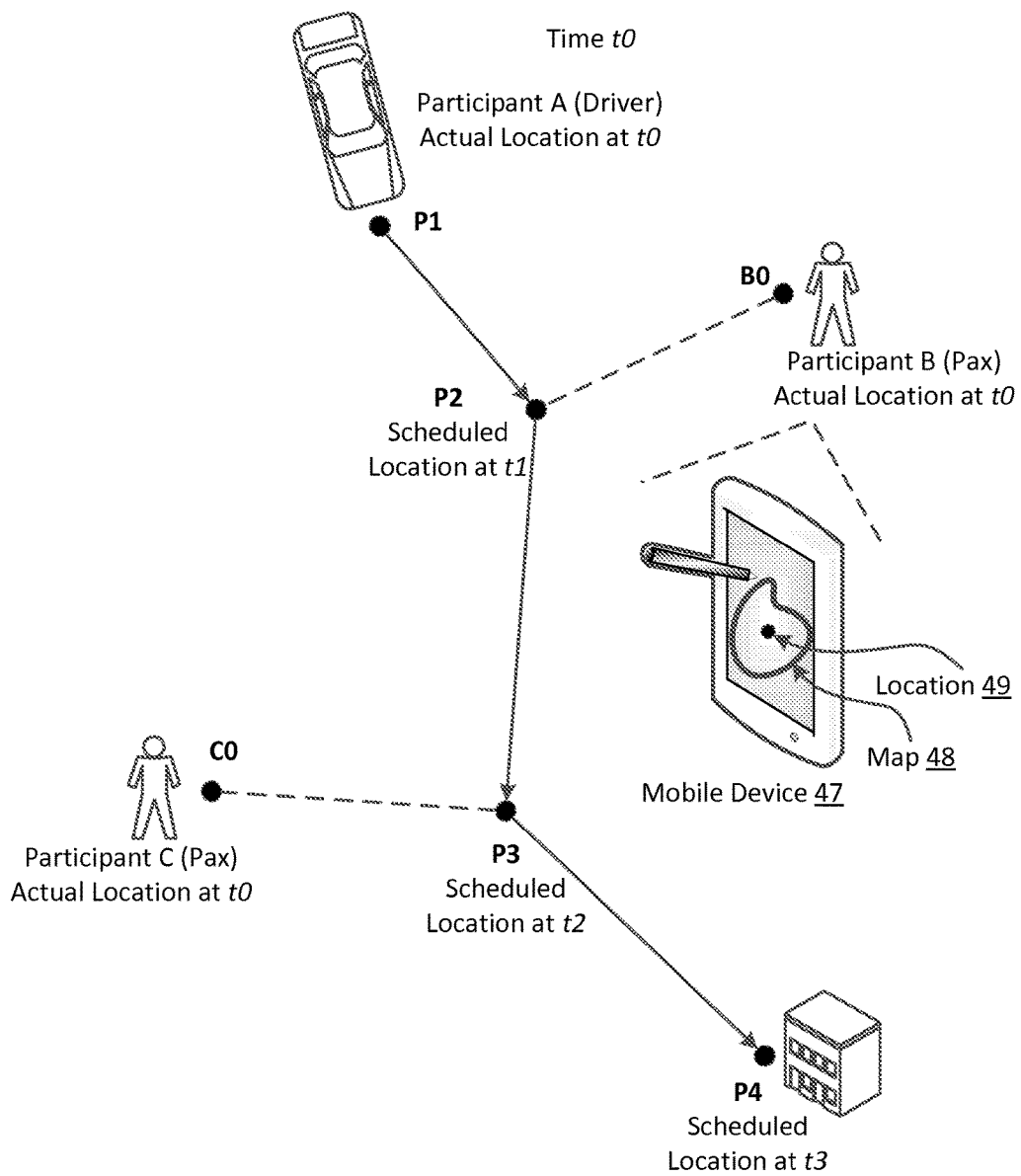
FIG. 3 shows a non-limiting example of how the processes described above may function.

FIG. 3 shows a non-limiting example of how the processes described above may function. At time t0, a carpool driver A may be at location P1 and en route to location P2, where the driver A is scheduled to pick up passenger B at time t1. Driver A may then be scheduled to drive to location P3 to pick up passenger C at time t2. Thereafter, driver A may be scheduled to drive to location P4, the final destination for participants A, B, and C, and arrive at location P4 at time t3.

At time t0, driver A may be at location P1, passenger B may be at location B0, and passenger C may be at location C0. Based on scheduled route and the location information about the participants, an updated expected arrival/pick up time for each passenger may be calculated, and/or a time for activating a reminder at a mobile computing device of at least one of the participants may also be calculated.

For example, as shown in the chart in FIG. 3, at time t0 driver A is at location P1 and scheduled to go to location P2 and arrive at time t1. Given the current location of driver A, driver A may be expected to arrive at location P2 at time t0 plus the time it takes to drive from P1 to P2. If passenger B, who is at location B0 at time t0, left location B0 to travel to location P2, passenger B would be expected to arrive at time t0 plus the time it takes to travel from B0 to P2. If passenger C, who is at location C0 at time t0, left location C0 to travel to location P3, passenger C would be expected to arrive at time t0 plus the time it takes to travel from C0 to P2.

With respect to the reminders, in order for passenger B to arrive at scheduled location P2 at time t1, passenger B would have to be reminded with at least enough time to travel from B0 to P2 to make it to P2 at or before t1. An additional time buffer factor of x, which may be selected by passenger B, may ensure that passenger B has sufficient advance notice to arrive at location P2 on time.

Similarly, in order for passenger C to arrive at scheduled location P3 at time t2, passenger C would have to be reminded with at least enough time to travel from C0 to P3 to make it to P3 at or before t2. An additional time buffer factor of y, which may be selected by passenger C, may ensure that passenger C has sufficient advance notice to arrive at location P3 on time.

Figure 4:
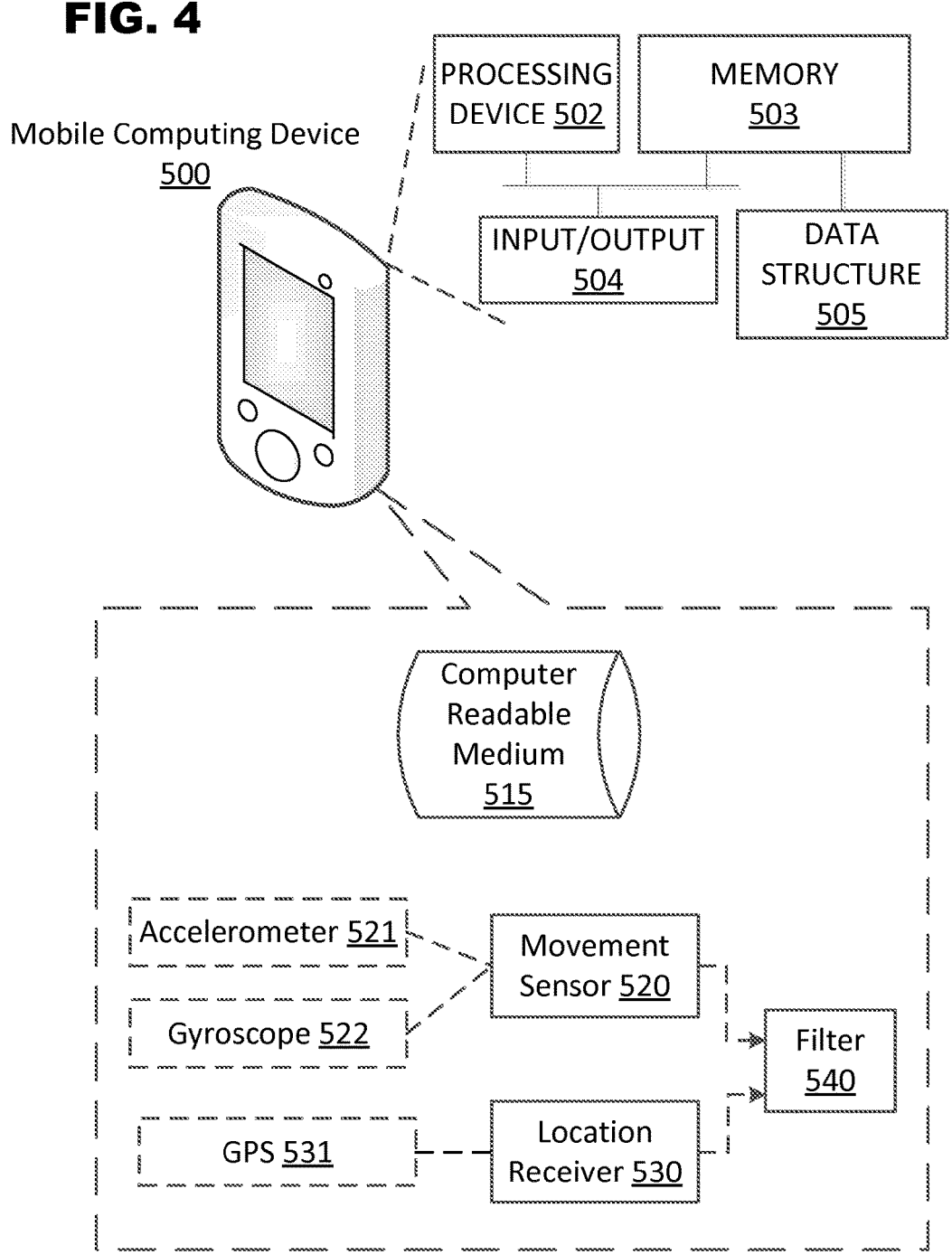
FIG. 4 shows an exemplary architecture of a mobile computing device.

FIG. 4 shows an exemplary architecture of a mobile computing device. A mobile computing device 500 may include a processing device 502, computer readable memory 515, movement sensor 520, location receiver/sensor 530, and/or filter 540.

The movement sensor 520 may detect a lack of movement of the mobile computing device 500 for a predetermined period. The movement sensor 520 may include an accelerometer 521, gyroscope 522, or other sensor capable of detecting movement.

The location receiver 530 may receive location data used to ascertain a location of the mobile computing device 500 through a receiver or sensor. The location receiver 530 may include a global positioning system sensor 531 or other local based services sensor providing data used to ascertain a location of the mobile computing device 500.

Filter 540 may be a noise reduction filter that reduces signal noise of signals from at least one of the movement sensor 520 and the location sensor 530. Different types of noise reduction filters 540 may be used depending on the particular application. For example, in some instances low pass filters, linear smoothing filters, median filters, and/or anisotropic filters may be used but in other instances other filter may be used.

The processing device 502 may be configured to ascertain a location of the mobile computing device using the location data received at the receiver at a first predetermined time before a scheduled event. The processing device 502 may also calculate a shortest route from the ascertained location to a scheduled event location and select a travel speed depending on a length of the calculated shortest route. The processing device 502 may calculate a travel time from the ascertained location to a scheduled event location at the selected travel speed. The processing device 502 may estimate an arrival time at the scheduled event location based on the calculated travel time and may activate a reminder on the mobile computing device reminding an event participant of the scheduled event when the estimated arrival time is within a second predetermined time of the scheduled carpool time.

The processing device 502 may also calculate a speed of the first mobile computing device based on a measured change in location of the first mobile computing device over a known time period. The processing device 502 may receive a location and a calculated speed of a second mobile computing device ascertained by the second mobile computing device at the predetermined time.

The processing device 502 may classify the calculated speed of each respective mobile computing device relative to a stationary, a walking, or a driving speed. The processing device 502 may calculate an expected arrival time of each user of the respective mobile computing devices at their scheduled meeting location based on the classified speed of their mobile computing device and a distance between the ascertained location of their mobile computing device and their scheduled meeting location.

The processing device 502 may also compare the expected arrival time of each user to their scheduled arrival time. The processing device 502 may depict on a map displayed on the first mobile computing device the location of each mobile computing device and an indication as to whether the expected arrival time of at least one user is within a predetermined period of their scheduled arrival time.

In addition to including a processing device 502, the mobile computing device 500 may also include a memory 503 storing loaded data or a loaded data structure 505, and an input/output interface 504, all of which may be interconnected via a system bus.

The output interface 504 may include an interface for presenting a location map, reminders, timing updates, and/or other information to the participant. The output interface 504 may connect to a display screen, a printer, or another computing device. The output interface 504 may enable communications between the mobile computing device 500 and other devices connected to the interface 504.

Mobile computing device 500 may have an architecture with modular hardware and/or software systems that include additional and/or different systems communicating through one or more networks. The modular design may support additions, exchanges, and upgrades to the mobile computing device 500, including the addition of components from different vendors in some embodiments.

In an embodiment, memory 503 may contain different components for retrieving, presenting, changing, and saving data and may include the computer readable medium 515. Memory 503 may include a variety of memory devices, for example, Dynamic Random Access Memory (DRAM), Static RAM (SRAM), flash memory, cache memory, and other memory devices. Additionally, for example, memory 503 and processing device(s) 502 may be distributed across several different computers that collectively comprise a system.

Processing device 502 may perform computation and control functions of a system and comprises a suitable central processing unit (CPU). Processing device 502 may include a single integrated circuit, such as a microprocessing device, or may include any suitable number of integrated circuit devices and/or circuit boards working in cooperation to accomplish the functions of a processing device. Processing device 502 may execute computer programs, such as object-oriented computer programs, within memory 503.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, although the computer readable medium 515 is shown as separate from the memory 503, in some instances the memory 503 may include computer readable medium 515 but in other instances the computer readable medium 515 may be separate from memory 503 or distributed over two or more systems that are configured to appear as a functionally integrated single mobile computing device 500.

I claim:

1. A method for dynamically distributing location information between carpool participants comprising:

ascertaining, with a location based service of a first mobile computing device utilizing a first global positioning system (GPS) sensor within the first mobile computing device, a location of the first mobile computing device of a first carpool participant at a predetermined time before a scheduled carpool time, the first mobile computing device further comprising at least one first accelerometer;

calculating, with a processing device of the first mobile computing device and utilizing the first GPS sensor and the at least one first accelerometer, in a first calculation, a speed of the first carpool participant based on a measured change in location of the first mobile computing device over a known time period;

receiving, with the processing device of the first mobile computing device, over a communications network, a location and a calculated speed of at least a second mobile computing device of at least a second carpool participant ascertained by the at least second mobile computing device at the predetermined time, the location and calculated speed of the at least one second mobile computing device being ascertained and calculated using a second GPS sensor and at least one second accelerometer within the at least one second mobile computing device;

classifying, with the processing device of the first mobile computing device, the calculated speed of each respective carpool participant relative to one of (1) a stationary speed, (2) a walking speed, or (3) a driving speed;

calculating, with the processing device of the first mobile computing device, in at least a second calculation, an expected arrival time of each respective carpool participant at their scheduled carpool meeting location based on their classified speed and a distance between their ascertained location and their scheduled carpool meeting location;

comparing, with the processing device of the first mobile computing device, in a first comparison, the expected arrival time of each respective carpool participant to their scheduled arrival time;

transmitting, with the processing device of the first mobile computing device, over the communications network, to the at least second mobile computing device, a scheduled arrival time update based on the first comparison;

depicting, on a map displayed on a display of the first mobile computing device, the location of each mobile computing device and an indication as to whether the expected arrival time of at least one carpool participant and their mobile computing device is within a predetermined period of their scheduled arrival time;

comparing, with the processing device of the first mobile computing device, in at least a second comparison, the ascertained location of the first mobile computing device to the at least one ascertained location of the at least second mobile computing device;

generating, with the processing device of the first mobile computing device, in at least a third calculation, a carpool route, an updated scheduled carpool meeting location of at least one of the first carpool participant and the at least second carpool participant, and an updated scheduled arrival time of at least one of the first carpool participant and the at least second carpool participant based on the second comparison and at least one of (1) achieving a minimum duration of the carpool and (2) achieving a minimum total distance traveled by each of the first carpool participant and the at least second carpool participant from their ascertained locations to their updated scheduled carpool meeting location; and transmitting, with the processing device of the first mobile computing device, the carpool route, the updated scheduled carpool meeting location, and the updated scheduled arrival time to the at least second mobile computing device.

2. The method of claim 1, further comprising repeating the steps of:
- ascertaining, with the location based service of the first mobile computing device of the first mobile computing device, the location of the first mobile computing device of the first carpool participant at the predetermined time before the scheduled carpool time;
- calculating, with the processing device of the first mobile computing device, in the first calculation, the speed of the first carpool participant based on the measured change in location of the first mobile computing device over the known time period;
- receiving, with the processing device of the first mobile computing device, over a communications network, the location and the calculated speed of the at least second mobile computing device of the at least second carpool participant ascertained by the at least second mobile computing device at the predetermined time;
- classifying, with the processing device of the first mobile computing device, the calculated speed of each respective carpool participant relative to one of (1) the stationary speed, (2) the walking speed, or (3) the driving speed;
- calculating, with the processing device of the first mobile computing device, in the at least second calculation, the expected arrival time of each respective carpool participant at their scheduled carpool meeting location based on their classified speed and the distance between their ascertained location and their scheduled carpool meeting location;
- comparing, with the processing device of the first mobile computing device, in the first comparison, the expected arrival time of each respective carpool participant to their scheduled arrival time; and
- transmitting, with the processing device of the first mobile computing device, over the communications network, to the at least one second mobile computing device, the scheduled arrival time update based on the first comparison,
- at each of a plurality of predetermined time intervals to transmit scheduled arrival time updates at a rate corresponding to the predetermined time intervals.

3. The method of claim 2, further comprising:
- selecting a first time interval when a remaining battery power of the first mobile computing device exceeds a threshold; and
- selecting a second time interval less frequent than the first time interval when the remaining battery power does not exceed the threshold.

4. The method of claim 2, further comprising:
- classifying the speed as stationary when the calculated speed is less than 1 km/hr;
- classifying the speed as walking when the calculated speed is between 1 km/hr and 10 km/hr; and
- classifying the speed as driving when the calculated speed is above 10 km/hr.

5. The method of claim 4, further comprising calculating a time required to travel a shortest route at the classified speed from an ascertained location to a scheduled carpool meeting location to calculate the expected arrival time of the first carpool participant.

6. The method of claim 1, further comprising transmitting the scheduled arrival time update to a mobile computing device of a carpool participant requesting to receiving the scheduled arrival time update.

7. The method of claim 1, further comprising automatically transmitting the scheduled arrival time update to the at least second mobile computing device of the at least second carpool participant when the scheduled arrival time update is complete.

8. The method of claim 1, further comprising transmitting the carpool route, the updated scheduled carpool meeting location, and the updated scheduled arrival time as part of an update shown on a map of a mapping application on the display of the first mobile computing device and on a display of the at least second mobile computing device.

9. The method of claim 1, further comprising ascertaining the mobile computing device location based on a known location of a wireless hotspot device or router communicating with the mobile computing device.

10. A first mobile computing device comprising a non-transitory computer readable medium storing instructions that, when executed by a processing device, cause the processing device to:
- ascertain, with a location based service of the first mobile computing device utilizing a first global positioning system (GPS) sensor within the first mobile computing device, a location of the first mobile computing device of a first carpool participant at a predetermined time before a scheduled carpool time, the first mobile computing device further comprising at least one first accelerometer;
- calculate, in a first calculation utilizing the first GPS sensor and the first accelerometer, a speed of the first mobile computing device based on a measured change in location of the first mobile computing device over a known time period;
- receive a location and a calculated speed of at least a second mobile computing device of at least a second carpool participant ascertained by the at least second mobile computing device at the predetermined time, the location and calculated speed of the at least one second mobile computing device being ascertained and calculated using a second GPS sensor and at least one second accelerometer within the at least one second mobile computing device;
- classify the calculated speed of each respective mobile computing device relative to one of (1) a stationary speed, (2) a walking speed, or (3) a driving speed;
- calculate, in at least a second calculation, an expected arrival time of each respective carpool participant at their scheduled carpool meeting location based on their classified speed and a distance between the ascertained location of their mobile computing device and their scheduled carpool meeting location;
- compare, in a first comparison, the expected arrival time of each respective carpool participant to their scheduled arrival time;
- depict, on a map displayed on a display of the first mobile computing device, the location of each mobile computing device and an indication as to whether the expected arrival time of at least one carpool participant and their mobile computing device is within a predetermined period of their scheduled arrival time;
- compare, in at least a second comparison, the ascertained location of the first mobile computing device to the at least one ascertained location of the at least second mobile computing device;
- generate, in at least a third calculation, a carpool route, an updated scheduled carpool meeting location of at least one of the first carpool participant and the at least second carpool participant, and an updated scheduled arrival time of at least one of the first carpool participant and the at least second carpool participant based on the second comparison and at least one of
(1) achieving a minimum duration of the carpool and (2) achieving a minimum total distance traveled by each of the first carpool participant and the at least second carpool participant from their ascertained locations to their updated scheduled carpool meeting location; and
depict, on the map, the carpool route, the updated scheduled carpool meeting location, and the updated scheduled arrival time.

11. The medium of claim 10, wherein the computer readable medium stores further instructions that, when executed, cause the processing device to transmit the carpool route, the updated scheduled carpool meeting location, and the updated scheduled arrival time to the at least second mobile computing device.

12. A first mobile computing device comprising:
a receiver, of a location based service of the first mobile computing device, receiving location data from an external source to the first mobile computing device, the receiver comprising a first global positioning system (GPS) sensor;
at least one first accelerometer;
a display; and
processing device configured to:
ascertain a location of the first mobile computing device using the location data received at the receiver at a first predetermined time before a scheduled event;
calculate, in a first calculation utilizing the receiver and the at least one first accelerometer, a speed of the first mobile computing device based on a measured change in location of the first mobile computing device over a known time period;
receive a location and a calculated speed of at least a second mobile computing device ascertained by the at least second mobile computing device at the predetermined time, the location and calculated speed of the at least one second mobile computing device being ascertained and calculated using a second GPS sensor and at least one second accelerometer within the at least one second mobile computing device;
classify the calculated speed of each respective mobile computing device relative to one of (1) a stationary speed, (2) a walking speed, or (3) a driving speed;
calculate, in at least a second calculation, an expected arrival time of
each user of the respective mobile computing devices at their scheduled meeting location based on the classified speed of their mobile computing device and a distance between the ascertained location of their mobile computing device and their scheduled meeting location;
compare, in a first comparison, the expected arrival time of each user to their scheduled arrival time;
depict, on a map displayed on the display of the first mobile computing device, the location of each mobile computing device and an indication as to whether the expected arrival time of at least one user is within a predetermined period of their scheduled arrival time;
compare, in at least a second comparison, the ascertained location of the first mobile computing device to the at least one ascertained location of the at least second mobile computing device;
generate, in at least a third calculation, a carpool route, an updated scheduled carpool meeting location of at least one of the first carpool participant and the at least second carpool participant, and an updated scheduled arrival time of at least one of the first carpool participant and the at least second carpool participant based on the second comparison and at least one of (1) achieving a minimum duration of the carpool and (2) achieving a minimum total distance traveled by each of the first carpool participant and the at least second carpool participant from their ascertained locations to their updated scheduled carpool meeting location; and
depict, on the map, the carpool route, the updated scheduled carpool meeting location, and the updated scheduled arrival time.

13. The device of claim 12, wherein the first GPS sensor and the second GPS sensor receive location data from a GPS data source.

14. The device of claim 13, wherein the GPS data source is a GPS satellite.

15. The device of claim 12, wherein the receiver receives location data representing a known location of a wireless router or hotspot in communication with the mobile computing device.

* * * * *